US011568352B2

(12) United States Patent
Aziz

(10) Patent No.: US 11,568,352 B2
(45) Date of Patent: Jan. 31, 2023

(54) IMMERSIVE PACKAGING SYSTEM AND METHOD

(71) Applicant: Mehwish Aziz, New York, NY (US)

(72) Inventor: Mehwish Aziz, New York, NY (US)

( * ) Notice: Subject to any disclaimer, the term of this patent is extended or adjusted under 35 U.S.C. 154(b) by 214 days.

(21) Appl. No.: 17/093,789

(22) Filed: Nov. 10, 2020

(65) Prior Publication Data

US 2022/0147915 A1 May 12, 2022

(51) Int. Cl.
*G06Q 10/08* (2012.01)
*G06T 19/20* (2011.01)
*G06T 19/00* (2011.01)

(52) U.S. Cl.
CPC ..... *G06Q 10/0832* (2013.01); *G06Q 10/0833* (2013.01); *G06T 19/003* (2013.01); *G06T 19/20* (2013.01)

(58) Field of Classification Search
None
See application file for complete search history.

(56) References Cited

U.S. PATENT DOCUMENTS

| | | | |
|---|---|---|---|
| 6,688,075 B2 | 2/2004 | Cristina | |
| 7,128,265 B2 | 10/2006 | Silverbrook et al. | |
| 7,383,991 B2 | 6/2008 | Silverbrook et al. | |
| 8,090,461 B2 | 1/2012 | Ohiaer et al. | |
| 9,098,873 B2 | 8/2015 | Geisner et al. | |
| 9,626,712 B1 | 4/2017 | Shakes et al. | |
| 10,373,281 B2 | 8/2019 | Lutnick et al. | |
| 10,762,331 B1* | 9/2020 | Zhang | G06V 10/764 |
| 10,991,116 B1* | 4/2021 | Barish | G06V 20/64 |
| 11,301,604 B1* | 4/2022 | Houchens | G06F 30/23 |
| 2005/0177453 A1 | 8/2005 | Anton et al. | |
| 2008/0012863 A1 | 1/2008 | Finn et al. | |
| 2011/0004524 A1 | 1/2011 | Paul et al. | |
| 2013/0293539 A1* | 11/2013 | Hunt | G01B 11/00 345/420 |
| 2014/0336027 A1* | 11/2014 | Kulkarni | G06F 30/17 493/55 |

(Continued)

OTHER PUBLICATIONS

"A Guide to Simulation Software for 3D Printing," https://www.azom.com/article.aspx?ArticleID=17327 [date accessed: Aug. 25, 2020].

(Continued)

*Primary Examiner* — Toan H Vu
(74) *Attorney, Agent, or Firm* — Michael J. Feigin, Esq.; Feigin and Fridman LLC

(57) ABSTRACT

A packaging system and method includes an immersive reality system that renders a 3D representation of an item to be shipped and the shipping box in which the item is to be shipped. A server includes a database of items and item data and shipping box data, which is used to produce a 3D representation of the item and the shipping box. A GUI exhibits the items such that a user may selectively view, select, and/or manipulate the items. A computer enables a user to query the server to ship a selected item. A network node transmits selected item data and shipping box data to the immersive reality system. The 3D representations include position and orientation data enabling manipulation of the 3D representation of the selected item relative to the 3D representation of the shipping box into a desired position. The system ships the selected item in the desired position.

17 Claims, 5 Drawing Sheets

(56) References Cited

U.S. PATENT DOCUMENTS

| | | | |
|---|---|---|---|
| 2014/0365336 A1 | 12/2014 | Hurewitz | |
| 2017/0024787 A1* | 1/2017 | Mathew | G06Q 30/0605 |
| 2017/0116667 A1 | 4/2017 | High et al. | |
| 2017/0186064 A1* | 6/2017 | Kaptsan | G06Q 50/01 |
| 2018/0089622 A1* | 3/2018 | Burch, V | G01S 19/49 |
| 2018/0158133 A1 | 6/2018 | Davis et al. | |
| 2019/0127099 A1 | 5/2019 | Langen | |
| 2020/0077383 A1* | 3/2020 | Zhang | H04W 72/14 |
| 2021/0012522 A1* | 1/2021 | Wang | G06T 7/13 |
| 2021/0141964 A1* | 5/2021 | Jalla | G06F 30/13 |
| 2021/0319398 A1* | 10/2021 | Streebin | G06Q 10/0833 |
| 2022/0130126 A1* | 4/2022 | Delgado | G06T 19/006 |

OTHER PUBLICATIONS

"Print Multiple Parts in Shadowed Empty Space," Ultimaker Cura, https://community.ultimaker.com/topic/10088 [date accessed: Aug. 25, 2020].

\* cited by examiner

IMMERSIVE PACKAGING SYSTEM AND METHOD

FIELD OF THE DISCLOSED TECHNOLOGY

The disclosed technology relates to packaging systems. More specifically, the disclosed technology relates to a virtual packaging system employing an immersive reality system to ship an item in a desired manner within a shipping box.

BACKGROUND OF THE DISCLOSED TECHNOLOGY

In conventional packaging systems, purchased, selected, procured, or otherwise desired items that are to be shipped are shipped within a shipping box according to the entity shipping the item. Indeed, the individual making the query to the entity to ship the item has no say whatsoever in terms of how the item to be shipped is positioned or oriented within the box during shipping. Rather, the entity shipping the item places the item in the box either without considering the position or orientation of the item within the shipping box during shipping process and/or according to whichever position and orientation suits their own packaging system or logistics infrastructures.

Moreover, although items can typically be viewed virtually on online stores, websites, and the like, there is no means for manipulating those items to position and orient them with respect to another item, such as a shipping box.

Accordingly, there is a need for an immersive reality system that enables individuals to immersivity position and orient an item to be shipped within a shipping box in a desired manner prior to shipping.

SUMMARY OF THE DISCLOSED TECHNOLOGY

Disclosed herein is a method of packaging an item using an immersive reality system including querying a server to ship an item, in response to the query, transmitting shipping box data to produce a representation of a shipping box and sending item data to produce a representation of the item, receiving position and orientation data of the position and orientation of the representation of the item relative to the position and orientation of the representation of the shipping box, producing a manipulable three-dimensional (3D) representation of the item within the shipping box based on the shipping box data, item data, and position and orientation data, the manipulable 3D representation of the item within the shipping box including a manipulable 3D image of the item and a manipulable 3D image of the shipping box, positioning the 3D image of the item in a specific desired position and orientation within the 3D image of the shipping box, and shipping the selected item within a shipping box in the desired position and orientation.

In embodiments, the step of querying the server to ship an item includes exhibiting a plurality of items for selection of an item of the plurality of items and selecting an item from the plurality of exhibited items.

In some emthe shipping box data and item data are transmitted via a network node.

In other embodiments, the method further includes, sending to the server, position and orientation data corresponding to the specific desired position and orientation of the 3D image of the box within the 3D image of the shipping box to the server prior to shipping.

In embodiments, the manipulable 3D representation of the item within the shipping box is produced on a graphic user interface with a virtual reality system.

In other embodiments, the manipulable 3D representation of the item within the shipping box is produced on a graphic user interface with an augmented reality system.

In some embodiments, the method includes superimposing the manipulable 3D representation of the item within the shipping box over a real-life area of a user's environment through the graphic user interface.

In embodiments, the method includes capturing the user's environment through a camera in communication with the augmented reality system.

In other embodiments, the method includes determining the position and orientation of the graphic user interface and real-life area of the user's environment relative to the manipulable 3D representation of the item within the shipping box with a global positioning system, gyroscope, compass, and/or an accelerometer.

The present disclosed technology also provides a system of packaging an item using an immersive reality system including a server including a database of a plurality of items, item data of the plurality of items used to produce a representation of each of the plurality of items, and shipping box data used to produce a representation of a shipping box sized to fit any variation of the plurality of items therein, a graphic user interface selectively exhibiting the plurality of items to view, select, and manipulate an item of the plurality of items, a computer processor to query the server to ship an item of the plurality of items, a network node to transmit the item data and the shipping box data, an immersive reality system to render a three-dimensional (3D) image of an item of the plurality of items and a shipping box. The network node transmits item data and shipping box data to the immersive reality system in response to a query by the computer processor to ship an item selected from the plurality of items on the graphic user interface. The immersive reality system then renders, on the graphic user interface, a 3D image of said selected item and a 3D image of a shipping box sized to fit the selected item therein based on the transmitted item data and shipping box data, the 3D image of the selected item including position and orientation data relative to the 3D shipping box image enabling manipulation of the 3D image of the selected item via the graphic user interface into a desired position and orientation within the 3D image of the shipping box, the immersive reality system transmitting the position and orientation data of the 3D image of the selected item relative to the 3D image of the shipping box in the desired position to the server. Finally, the server ships the selected item within a shipping box in the desired position and orientation.

In some embodiments, the item data includes the size and dimensions of the selected item, while the shipping box data includes the size and dimensions of a box of the plurality of shipping boxes that is sized to receive the selected item.

In other embodiments, the item is selected via the network node by an intended recipient of the item.

In embodiments, the immersive reality system comprises a virtual reality system, the virtual reality system rendering, on the graphic user interface, a virtual 3D image of the selected item and a virtual 3D image of a shipping box, the virtual reality system transmitting the position and orientation data of the virtual 3D image of the selected item relative to the virtual 3D image of the shipping box in the desired position to the server.

In embodiments, the immersive reality system comprises an augmented reality system, the augmented reality system rendering, on the graphic user interface, an augmented 3D image of the selected item and an augmented 3D image of a shipping box, the augmented reality system transmitting the position and orientation data of the augmented 3D image of the selected item relative to the augmented 3D image of the shipping box in the desired position to the server.

In some embodiments, the augmented reality system comprises a camera coupled to the graphic user interface for providing a live feed to the graphic user interface of the user's environment, and a global positioning system, a compass, a gyroscope, and an accelerometer for providing data of the position of the graphic user interface.

In other embodiments, the augmented reality system is configured to superimpose, through the graphic user interface, the augmented 3D image of the selected item and the augmented 3D image of a shipping box on an area in the user's environment such that the augmented 3D image of the selected item and the augmented 3D image of a shipping box appear to be in the user's immediate environment.

"Three-dimensional" is defined as "having or appearing to have length, breadth, and depth." "Immersive" is defined as "actively engaging one's senses such as by generating a three-dimensional image which appears to physically exist as such," or "providing, involving, or characterized by deep absorption or immersion in something, such as an artificial environment." "Virtual" is defined as "not physically existing as such but made by software to appear as such." "Augmented" is defined as "an image, either three-dimensional or two-dimensional, that is virtually superimposed on a virtual or real-life environment." "Immersive reality" is defined as "the perception of something being physically present in a non-physical world, such virtual objects integrated with real-world elements." "Virtual reality" is defined as "the perception of a completely virtual world or environment filled only with virtual objects." "Augmented reality" is defined as "the perception of virtual objects and other additional information layered on top of a real world environment or area." "Immersive reality system" is defined as "a computer program or software employing digital technology, which creates the perception of something being physically present in a non-physical world, such as by integrating virtual and real-world elements." "Virtual reality system" is defined as "a computer program or software that allows users to explore and interact with a computer-generated virtual world filled only with virtual objects." "Augmented reality system" is defined as "a computer program or software employing digital technology that allows users to see the real world, with computer-generated additional information and virtual objects layered on top." "Query" is defined as "a request for data or information from a computer database table or combination of tables." "Server" is defined as "computer hardware or software (computer program) that provides functionality for other programs, hardware, or devices." "Network" is defined as "a system of computers and peripherals that are able to communicate with each other." "Network node" is defined as "an electronic device that is attached to a network, and is capable of creating, receiving, or transmitting information over a communications channel." "Graphic user interface" is defined as "an interface, such as a display screen, that allows users to interact with electronic devices through graphical icons and audio indicator." "Live feed" is defined as "a live broadcast or stream of audio and/or visual data through an imager, such as a camera, to a graphic user interface or display screen." "Real-life area" is defined as "an area of the real world that a user can view through any type of interface." "Manipulate" is defined as "to touch, alter, move by any means to change the relative position and/or orientation." "Shipping box" is defined as "a container made of any material such as paper, plastic, wood, and/or metal used to package goods for shipping."

Any device or step to a method described in this disclosure can comprise or consist of that which it is a part of, or the parts which make up the device or step. The term "and/or" is inclusive of the items which it joins linguistically and each item by itself. "Substantially" is defined as "at least 95% of the term being described" and any device or aspect of a device or method described herein can be read as "comprising" or "consisting" thereof.

DETAILED DESCRIPTION OF EMBODIMENTS OF THE DISCLOSED TECHNOLOGY

The disclosed technology provides a system and method including an immersive reality system that renders virtual three-dimensional (3D) representations of an item to be shipped and the shipping box in which the item is to be shipped, so as to enable a user to manipulate the 3D representation of the item to be shipped to position and/or orient the item to be shipped in a desired position within the three-dimensional representation of shipping box. A server includes a database of items and item data and shipping box data related to the items, which is used to produce a virtual 3D representation of a shipping box. A graphic user interface (GUI) selectively exhibits all the items such that a user may selectively view, select, and/or manipulate any item. A computer processor enables a user to query the server to ship one of the items. A network node transmits the item data and shipping box data to the immersive reality system in response to a query by the computer processor to ship an item selected by a user on the GUI. The 3D representations of the selected item and shipping box are rendered based on the transmitted item data and shipping box data and include position and orientation data enabling manipulation of the 3D representation of the selected item relative to the 3D representation of the shipping box into a desired position. The system transmits the position and orientation data of the 3D representation of the selected item relative to the 3D representation of the shipping box in the desired position to the server. The server then ships the selected item within a shipping box in the desired position and orientation.

Embodiments of the disclosed technology will become clearer in view of the following description of the figures.

Figure 1:
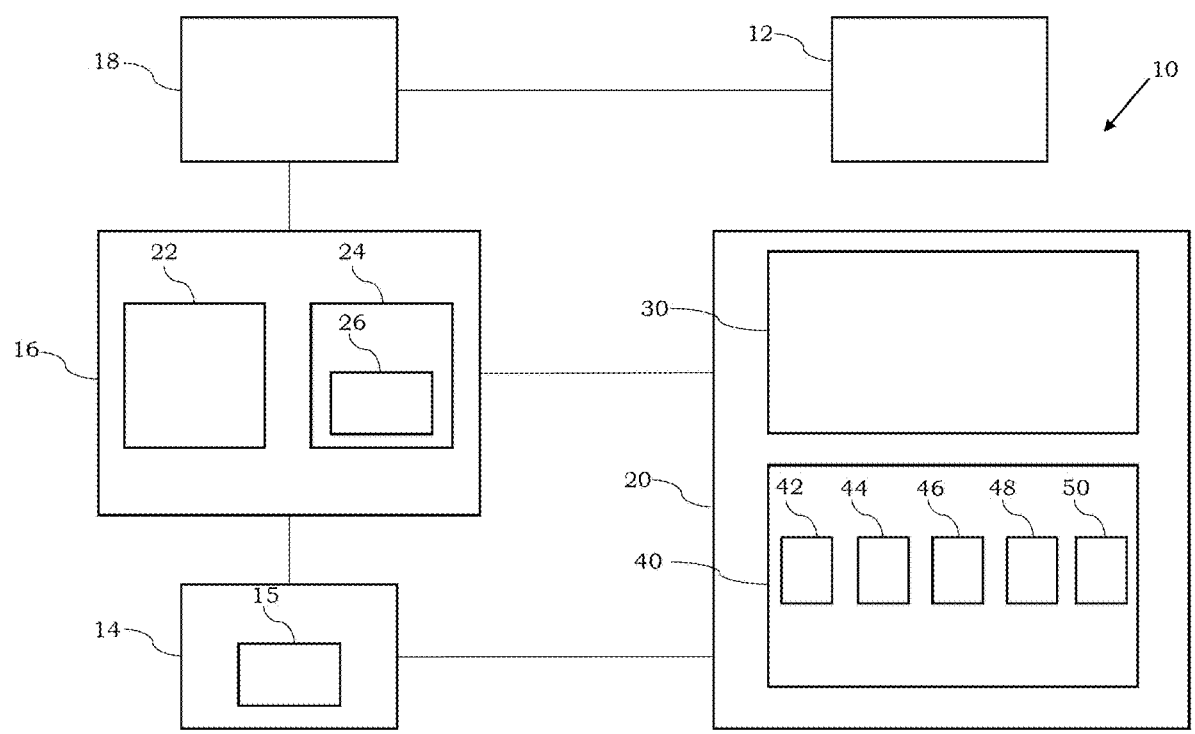
FIG. 1 shows a high-level block diagram of the components of immersive packaging system according to one embodiment of the present disclosed technology.

FIG. 1 shows a diagram of the components of the immersive packaging system 10. In embodiments, the immersive packaging system 10 comprises a server 12, a GUI 14, a computer 16, a network node 18, and an immersive reality system 20. The server 12 includes a database of a plurality of items, item data corresponding to each of the plurality of items, and shipping box data corresponding to a shipping box that corresponds to the plurality of items. The item data is used by the system to produce a 3D representation of each of the plurality of items. The shipping box data is used to produce a 3D representation of a shipping box is sized and configured to receive, accept, and otherwise fit, for the purposes of shipping, any variation of the plurality of items therein. The plurality of items may be any item that can reasonably be shipped within a shipping box, such as consumer goods, pharmaceuticals, plants, flowers, foodstuff, and the like.

The server 12 may include any computer database which displays various items and item information, in the form of images or visual data, to users for the purpose of viewing, sorting, purchasing, and/or ultimately selecting an item to have shipped. For example, the server 12 may include ecommerce websites, online marketplaces, transactional websites, and/or auction websites.

The GUI 14 selectively exhibits the plurality of items, such that a user may view, select, or otherwise manipulate each of the plurality of items. In this way, the GUI enables a user to sort through or navigate the database of the plurality of items so as to view any one of the items and/or select the items for further viewing of item information and/or specifications. The GUI may be the GUI of a smart electronic device such as smartphone, a computer tablet, or a laptop. The GUI comprises one or more inputs 15 for controlling the GUI 14.

The computer 16 enables users to query the server 12 to ship one of the plurality of items. The computer 16 includes a central processing unit or processor 22 having electronic circuitry, a memory 24 having a non-transitory computer readable medium, and/or a logic 26 having a specific set of instructions that are executable by the processor 22 and make up a computer program or software, such as a virtual reality software or program or an augmented reality software or program. The computer 16 may be the computer within a smart electronic device such as a smartphone, a computer tablet, or a laptop.

The network node 18 transmits item data and the shipping box data to the immersive reality system 20 upon a query by the computer 16 to the server 12 to ship a selected item from the plurality of items. The network node 18 enables a user, i.e., the intended recipient of the selected item, to select the item on the server 12. Note, the item data and the shipping box data corresponds to the selected item in that the item data includes the size and dimensions of the selected item and the shipping box data includes the size and dimensions of a shipping box that is sized to receive, accept, or otherwise fit the selected item therein for the purposes of packaging and shipping. The network node 18 may create, receive, and/or transmit information over a communications channel, such as a wide area network like the Internet, a personal area network, a local area network, a wireless local area network, a campus area network, a metropolitan area network, a storage area network, a system area network, a passive optical local area network, an enterprise private network, or a virtual private network.

The immersive reality system 20 comprises computer executable code or software that is disposed on the memory of the computer 16. The immersive reality system 20 utilizes the processor 22 to execute the code and render, via the GUI 14, a 3D representation of the item selected by the user as well as 3D representation of a shipping box sized to receive the selected item. The immersive reality system also renders the 3D representations of the selected item and shipping box based on the item data and shipping box data transmitted by the network node 18. The 3D representations of the selected item and the shipping box may include virtual 3D images, models, or holograms. The 3D representations of the selected item and the shipping box include relative position and orientation data which a user may manipulate, thereby enabling relative manipulation of the 3D representation of the selected item, via the GUI 14, with respect to the 3D representation of the shipping box. In this way, a user may position the 3D representation of the selected item in a desired position and orientation within the 3D representation of the shipping box. The immersive reality system 20 transmits to the server 12, via the network node 18, the position and orientation data of the 3D image of the selected item relative to the 3D image of the shipping box in the desired position so as to designate to the server 12 how the user wishes the item to be shipped within the shipping box. The server 12 then ships the selected item within a shipping box in the desired position and orientation.

In embodiments, the immersive reality system 20 comprises a virtual reality system 30. The virtual reality system 30 renders, on the GUI 14, a virtual 3D image of the selected item and a virtual 3D image of the shipping box. The virtual reality system 30 transmits to the server 12, via the network node 12, the position and orientation data of the virtual 3D image of the selected item relative to the virtual 3D image of the shipping box in the desired position.

In other embodiments, the immersive reality system 20 comprises an augmented reality system 40. The augmented reality system 40 renders, on the GUI 14, an augmented 3D image of the selected item and an augmented 3D image of a shipping box. The augmented reality system 40 transmits to the server 12, via the network node 18, the position and orientation data of the augmented 3D image of the selected item relative to the augmented 3D image of the shipping box in the desired position. The augmented reality system 40 comprises a camera 42, a global positioning system (GPS) 44, a compass 46, a gyroscope 48, and an accelerometer 50 for providing data of the position and orientation of the GUI 14 so as to enabled. The camera 42 provides a live feed of the user's environment to the GUI 14. The augmented reality system 40 may employ the camera, GPS, compass, gyroscope, and accelerometer of an electronic device such as a smartphone, a computer tablet, and a laptop. In operation, the augmented reality system 40 superimposes, through the GUI 14, the augmented 3D image of the selected item and the augmented 3D image of a shipping box on an area in live feed of the user's environment such that the augmented 3D image of the selected item and the augmented 3D image of a shipping box appear to be in the live feed of the user's environment.

Figure 2:
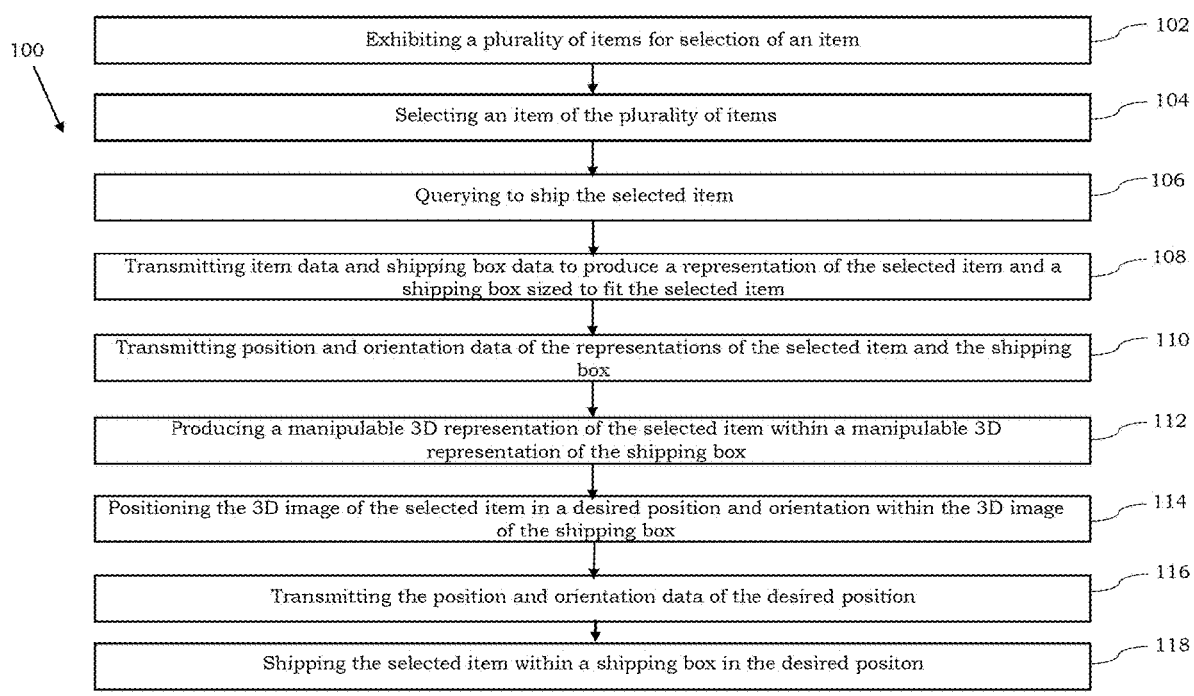
FIG. 2 shows a high-level flow chart of a method of using the immersive packaging system according to one embodiment of present disclosed technology.

FIG. 2 shows a high-level flow chart of a method of using the immersive reality system according to one embodiment of the present disclosed technology. In embodiments, the method 100 comprises exhibiting a plurality of items, via the GUI, for selection of an item of the plurality of items 102. Next, an item is selected from the plurality of exhibited items 104. Upon selection of the item, the server is queried to ship the selected item 106. In response to the query, item data, corresponding to the size and dimensions of the selected item, is transmitted to the immersive reality system, via the network node, to produce a representation of the selected item and shipping box data, corresponding to the size and dimensions of a shipping box sixed to receive, accept, or otherwise fit the selected item therein, is transmitted to produce a representation of a shipping box 108. The item data and shipping box data may be transmitted simultaneously or in turn.

Next, position and orientation data of the position and orientation of representation of the selected item relative to the position and orientation data of the representation of the shipping box is transmitted, via the network node, to the immersive reality system 110. Next, a manipulable 3D representation of the item within the shipping box, based on the item data, shipping box data, and position and orientation data is produced on the GUI by the immersive reality system 112, such as the virtual reality system or augmented reality system discussed above. The manipulable 3D representation of the item within the shipping box includes a manipulable 3D image of the selected item and a manipulable 3D image of the shipping box. Next, the 3D image of the selected item is positioned in a specific desired position and orientation within the 3D image of the shipping box 114. Next, the position and orientation data corresponding to the specific desired position and orientation of the 3D image of the box within the 3D image of the shipping box is transmitted to the server via the network node 116. Finally, the selected item is shipped within a shipping box in the desired position and orientation 118.

Figure 3:
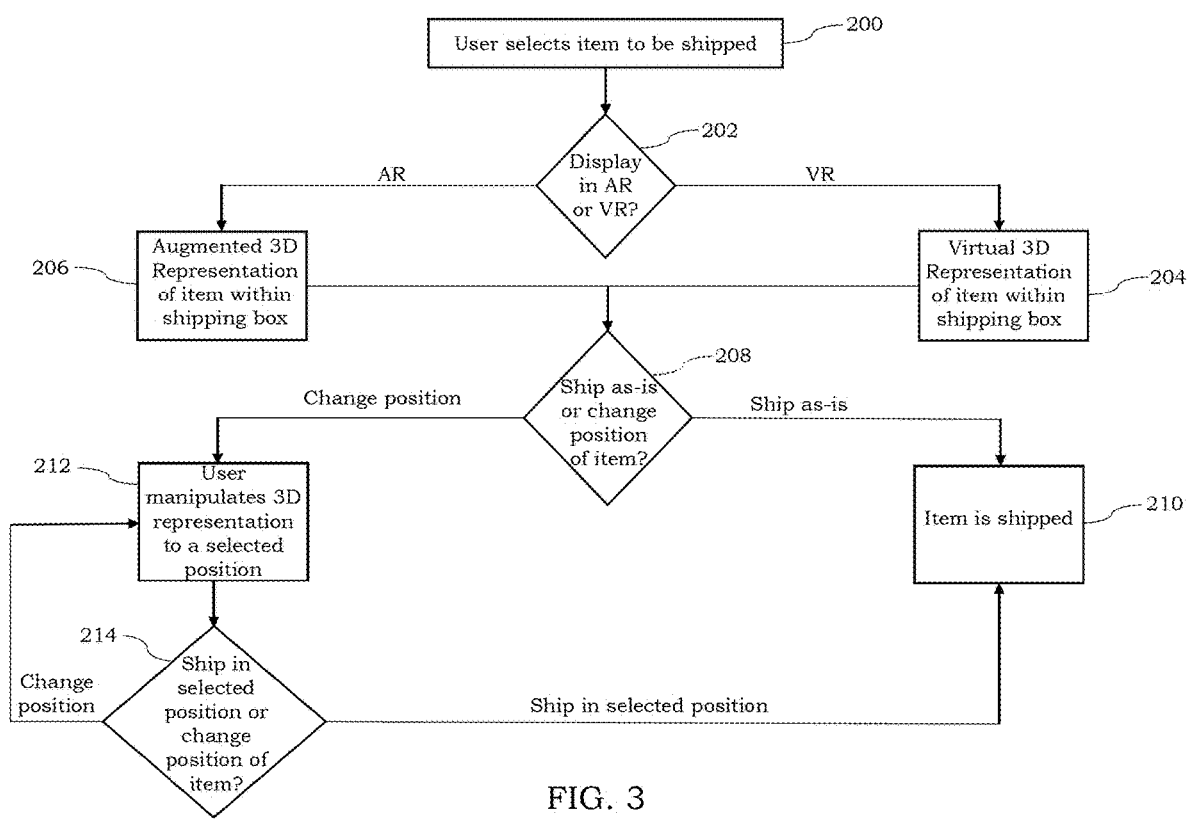
FIG. 3 shows a high-level flow chart of a method of using the immersive packaging system according to one embodiment of present disclosed technology.

FIG. 3 shows a high-level flow chart of a method of using the immersive reality system according to one embodiment of the present disclosed technology. In one operation of the immersive reality system, a user selects an item from the server to have the shipped to him or her 200. When the item is selected, the system queries the user whether to view the item and shipping box in VR or AR on their GUI 202. If the user selects VR, the GUI displays a virtual 3D representation of the item to be shipped within a virtual 3D representation of the shipping box in which item is to be shipped 204. Virtual in that the 3D representations are displayed in a virtual world. If the user selects AR, the GUI displays an augmented 3D representation of the item to be shipped within an augmented 3D representation of the shipping box in which item is to be shipped 206. Augmented in that the 3D representations are superimposed on a real-life area of the user's environment using a live feed of a camera. Note, the system portrays the item within the shipping box in the way in which the system intends to ship the box. Once the 3D representations are displayed, the system then queries the user whether to ship the item in the shipping box as-is, i.e., in the orientation in which it appears in the shipping box, or whether the user wants to change the position and orientation of the item within the shipping box 208. If the user choses to ship the item in the shipping box as-is, the system ships the item 210. If the user choses to change the position and orientation of the item, then the system allows the user to manipulate, via the GUI, the position and orientation of the item to be shipped relative to the shipping box to a selected position 212. Finally, the system queries the user whether to ship the item within the shipping box in the selected position or whether to continue changing the position and orientation of the item within the shipping box 214. If the user choses to ship, the item ships 210. If the user choses to continue to change the position and orientation of the item within the shipping box, then the system continues to allow the user to manipulate the position and orientation of the item to be shipped relative to the shipping box to a desired position 212.

Figure 4:
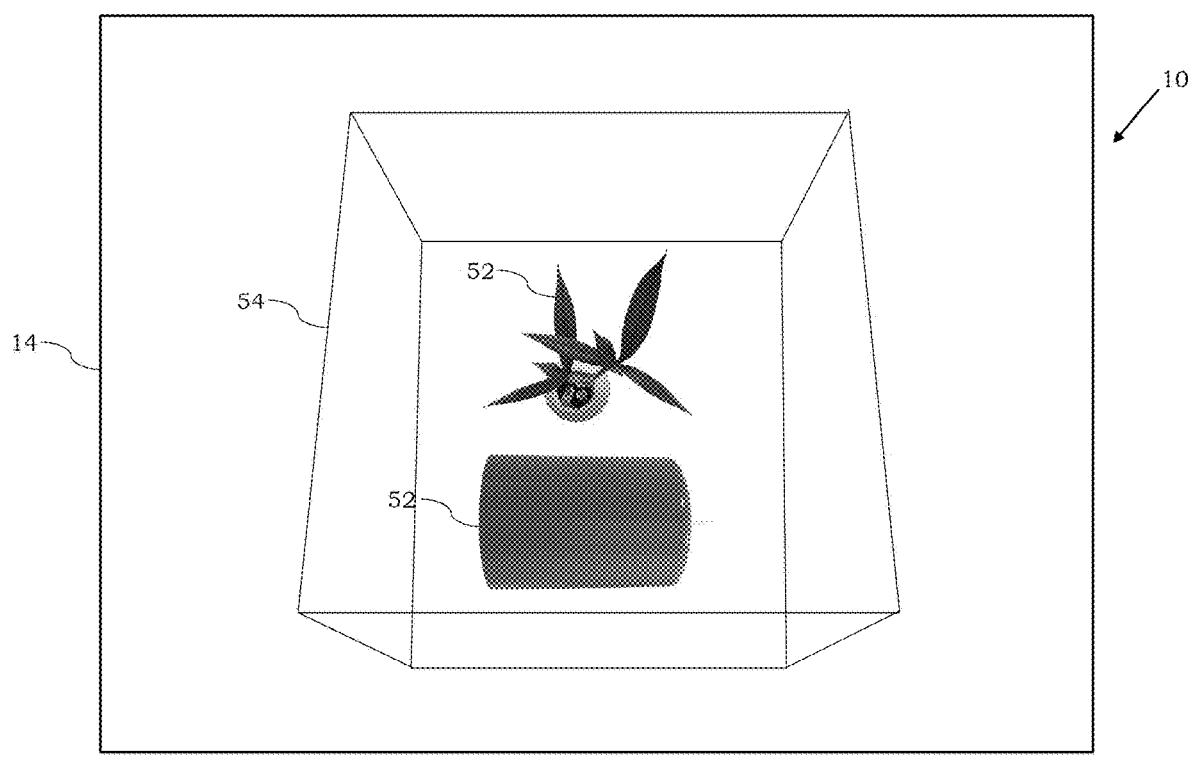
FIG. 4 shows a high-level diagram of how the 3D representations of a selected item and the shipping box appear on a GUI of the immersive packaging system according to one embodiment of the present disclosed technology.

FIG. 4 shows a high-level diagram of how the 3D representations of selected items 52 and the shipping box 54 may appear on a GUI 14 after they have been generated by the immersive packaging system 10. For example, the 3D representation of the shipping box 54 may initially appear as a top down view such that a user may see the selected items 52 within the interior of the shipping box 54 in order to arrange them as desired therewithin. The 3D presentation of the shipping box 54 may be manipulated to reposition the shipping box 54 such that a user may see any variety of perspective views, top views, side views, or bottom views. The selected items 52 may be manipulated as well to reposition the selected items 52 in any manner within the shipping box 54.

Figure 5:
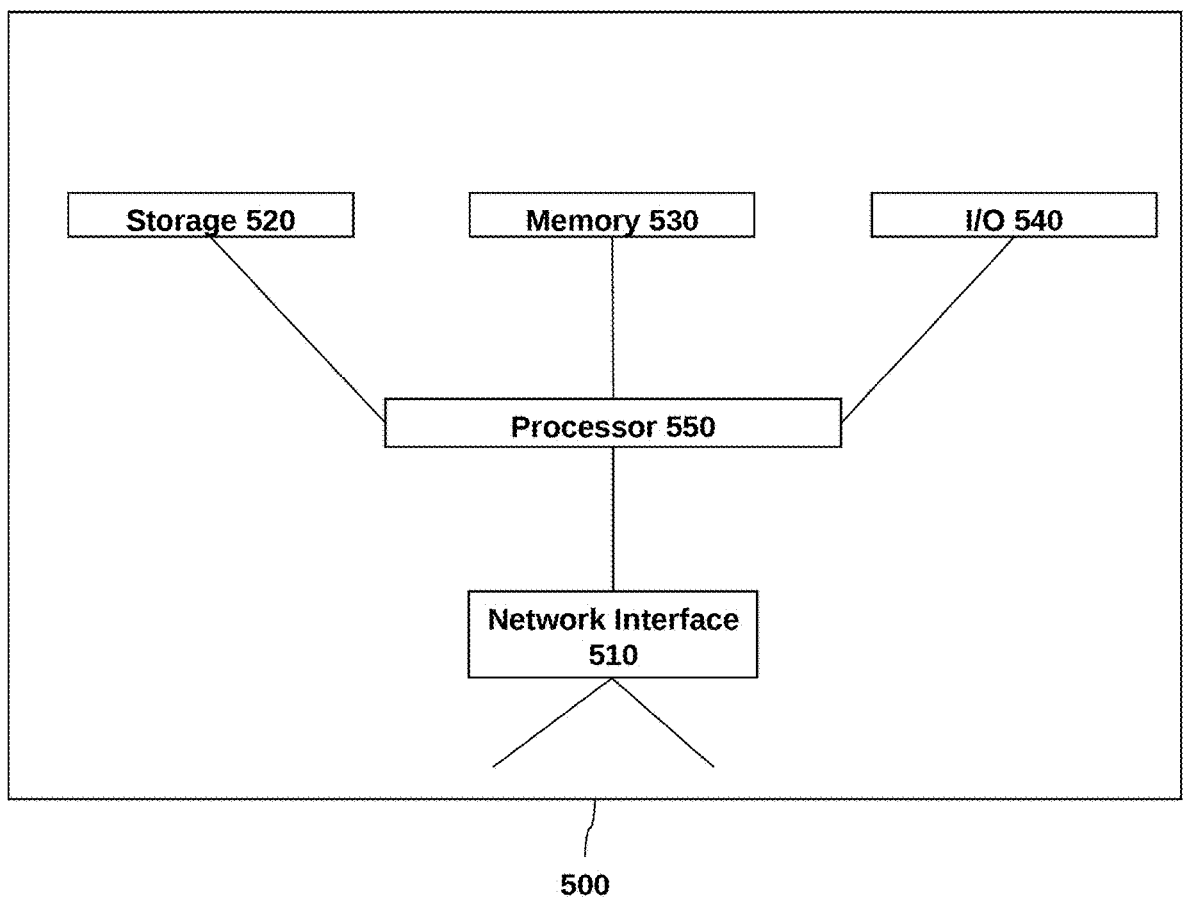
FIG. 5 shows a high-level block diagram of a device that may be used to carry out the disclosed technology according to one embodiment of the present disclosed technology.

FIG. 5 shows a high-level block diagram of a device that may be used to carry out the disclosed technology. Device 600 comprises a processor 650 that controls the overall operation of the computer by executing the device's program instructions which define such operation. The device's program instructions may be stored in a storage device 620 (e.g., magnetic disk, database) and loaded into memory 630, when execution of the console's program instructions is desired. Thus, the device's operation will be defined by the device's program instructions stored in memory 630 and/or storage 620, and the console will be controlled by processor 650 executing the console's program instructions. A device 600 also includes one, or a plurality of, input network interfaces for communicating with other devices via a network (e.g., the internet). The device 600 further includes an electrical input interface. A device 600 also includes one or more output network interfaces 610 for communicating with other devices. Device 600 also includes input/output 640, representing devices which allow for user interaction with a computer (e.g., display, keyboard, mouse, speakers, buttons, etc.). One skilled in the art will recognize that an implementation of an actual device will contain other components as well, and that FIG. 5 is a high-level representation of some of the components of such a device, for illustrative purposes. It should also be understood by one skilled in the art that the method and devices depicted in FIGS. 1 through 4 may be implemented on a device such as is shown in FIG. 5.

The present technology can be carried out with one or more of the embodiments described. The drawings show embodiments with the understanding that the present description is to be considered an exemplification of the principles and is not intended to be exhaustive or to limit the disclosure to the details of construction. The arrangements of the components are set forth in the following description or illustrated in the drawings.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

I claim:

1. A method of packaging an item using an immersive reality system, comprising:
   querying a server to ship an item;
   in response to the query, transmitting shipping box data to produce a representation of a shipping box and transmitting item data to produce a representation of the item;

receiving position and orientation data of the position and orientation of the representation of the item relative to the position and orientation of the representation of the shipping box;

producing a manipulable three-dimensional (3D) representation of the item within the shipping box based on the shipping box data, item data, and position and orientation data, the manipulable 3D representation of the item within the shipping box including a manipulable 3D image of the item and a manipulable 3D image of the shipping box;

positioning the 3D image of the item in a specific desired position and orientation within the 3D image of the shipping box;

superimposing the manipulable 3D representation of the item within the shipping box over a real-life area of a user's environment through a graphic user interface; and shipping the selected item within a shipping box in the desired position and orientation.

2. The method of claim 1, wherein the step of querying the server to ship an item comprises exhibiting a plurality of items for selection of an item of the plurality of items.

3. The method of claim 2, wherein the step of querying the server to ship an item further comprises selecting an item from the plurality of exhibited items.

4. The method of claim 1, wherein the shipping box data and item data are transmitted via a network node.

5. The method of claim 1, further comprising transmitting to the server via the network node the position and orientation data corresponding to the specific desired position and orientation of the 3D image of the box within the 3D image of the shipping box to the server prior to shipping.

6. The method of claim 1, wherein the manipulable 3D representation of the item within the shipping box is produced on a graphic user interface with a virtual reality system.

7. The method of claim 1, wherein the manipulable 3D representation of the item within the shipping box is produced on a graphic user interface with an augmented reality system.

8. The method of claim 1, capturing the user's environment through a camera in communication with the augmented reality system.

9. The method of claim 8, determining the position and orientation of the graphic user interface and real-life area of the user's environment relative to the manipulable 3D representation of the item within the shipping box with a global positioning system, gyroscope, compass, and/or an accelerometer.

10. A system of packaging an item using an immersive reality system, comprising:

a server including a database of a plurality of items, item data of the plurality of items used to produce a representation of each of the plurality of items, and shipping box data used to produce a representation of a shipping box sized to fit any variation of the plurality of items therein;

a graphic user interface selectively exhibiting the plurality of items to view, select, and manipulate an item of the plurality of items;

a computer processor to query the server to ship an item of the plurality of items;

a network node to transmit the item data and the shipping box data; and an immersive reality system to render a three-dimensional (3D) image of an item of the plurality of items and a shipping box;

wherein:

the network node transmits item data and shipping box data to the immersive reality system in response to a query by the computer processor to ship an item selected from the plurality of items on the graphic user interface;

the immersive reality system renders, on the graphic user interface, a 3D image of said selected item and a 3D image of a shipping box sized to fit the selected item therein based on the transmitted item data and shipping box data, the 3D image of the selected item including position and orientation data relative to the 3D shipping box image enabling manipulation of the 3D image of the selected item via the graphic user interface into a desired position and orientation within the 3D image of the shipping box, the immersive reality system transmitting the position and orientation data of the 3D image of the selected item relative to the 3D image of the shipping box in the desired position to the server;

wherein the immersive reality system further superimposes the manipulable 3D representation of the item within the shipping box over a real-life area of a user's environment through the graphic user interface; and the server ships the selected item within a shipping box in the desired position and orientation.

11. The system of claim 1, wherein the item data includes the size and dimensions of the selected item.

12. The system of claim 8, wherein the shipping box data includes the size and dimensions of a shipping box of the plurality of shipping boxes that is sized to receive the selected item.

13. The system of claim 12, wherein the item is selected via the network node by an intended recipient of the item.

14. The system of claim 1, wherein the immersive reality system comprises a virtual reality system, the virtual reality system rendering, on the graphic user interface, a virtual 3D image of the selected item and a virtual 3D image of a shipping box, the virtual reality system transmitting the position and orientation data of the virtual 3D image of the selected item relative to the virtual 3D image of the shipping box in the desired position to the server.

15. The system of claim 1, wherein the immersive reality system comprises an augmented reality system, the augmented reality system rendering, on the graphic user interface, an augmented 3D image of the selected item and an augmented 3D image of a shipping box, the augmented reality system transmitting the position and orientation data of the augmented 3D image of the selected item relative to the augmented 3D image of the shipping box in the desired position to the server.

16. The system of claim 15, wherein the augmented reality system comprises a camera coupled to the graphic user interface for providing a live feed to the graphic user interface of the user's environment, and a global positioning system, a compass, a gyroscope, and an accelerometer for providing data of the position of the graphic user interface.

17. The system of claim 16, wherein the augmented reality system is configured to superimpose, through the graphic user interface, the augmented 3D image of the selected item and the augmented 3D image of a shipping box on an area in the live feed user's environment such that the augmented 3D image of the selected item and the augmented 3D image of a shipping box appear to be in the live feed of the user's environment.

\* \* \* \* \*